(12) United States Patent
Qu et al.

(10) Patent No.: US 8,490,598 B2
(45) Date of Patent: Jul. 23, 2013

(54) IGNITION COIL WITH IONIZATION AND DIGITAL FEEDBACK FOR AN INTERNAL COMBUSTION ENGINE

(75) Inventors: Qiuping Qu, Troy, MI (US); Garlan J. Huberts, Milford, MI (US); Christopher Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 12/544,389

(22) Filed: Aug. 20, 2009

(65) Prior Publication Data

US 2011/0041803 A1 Feb. 24, 2011

(51) Int. Cl.
*G06F 19/00* (2011.01)
*G01N 27/62* (2006.01)

(52) U.S. Cl.
USPC .......... 123/406.2; 123/406.12; 123/536; 701/102; 324/459; 324/466; 324/468

(58) Field of Classification Search
USPC ... 123/406.2, 406.12, 169 R, 536; 73/114.67; 701/102; 324/459, 466, 468
See application file for complete search history.

(56) References Cited

U.S. PATENT DOCUMENTS

| | | | | |
|---|---|---|---|---|
| 4,495,918 A * | 1/1985 | Sugiura et al. | ........... | 123/406.16 |
| 5,215,067 A | 6/1993 | Shimasaki et al. | | |
| 5,299,543 A * | 4/1994 | Taruya et al. | ................. | 123/479 |
| 5,397,990 A * | 3/1995 | Ohsawa | ........................ | 324/399 |
| 5,571,245 A * | 11/1996 | Ooyabu et al. | ................ | 123/630 |
| 5,896,848 A * | 4/1999 | Dixon | ........................... | 123/609 |
| 5,945,828 A | 8/1999 | Katogi et al. | | |
| 5,970,952 A | 10/1999 | Mogi et al. | | |
| 5,992,386 A * | 11/1999 | Nytomt et al. | ........... | 123/406.37 |
| 6,076,502 A | 6/2000 | Katashiba et al. | | |
| 6,085,132 A * | 7/2000 | Ishii et al. | ........................ | 701/29 |
| 6,091,244 A * | 7/2000 | Rottler | ........................ | 324/378 |
| 6,378,494 B1 * | 4/2002 | Hatazawa et al. | ........ | 123/406.39 |
| 6,418,785 B1 * | 7/2002 | Hatazawa et al. | ........... | 73/35.08 |
| 6,691,555 B2 | 2/2004 | Ohkama et al. | | |
| 6,752,004 B2 | 6/2004 | Inada et al. | | |
| 6,786,200 B2 * | 9/2004 | Viele et al. | ............... | 123/406.27 |
| 6,799,564 B2 * | 10/2004 | Forster et al. | ................. | 123/644 |
| 6,813,933 B1 | 11/2004 | Ketterer et al. | | |
| 6,865,929 B2 * | 3/2005 | Okamura et al. | .......... | 73/114.67 |
| 6,922,628 B2 * | 7/2005 | Zhu et al. | ....................... | 701/111 |
| 6,951,201 B2 * | 10/2005 | Zhu et al. | ................. | 123/406.27 |
| 6,998,846 B2 * | 2/2006 | Daniels et al. | ................. | 324/399 |
| 7,013,871 B2 * | 3/2006 | Zhu et al. | ................. | 123/406.21 |
| 7,131,437 B2 * | 11/2006 | Ando et al. | .................... | 123/644 |
| 7,213,573 B2 * | 5/2007 | Daniels et al. | ........... | 123/406.28 |
| 7,530,350 B2 * | 5/2009 | Oono et al. | .................... | 123/652 |
| 7,818,998 B2 * | 10/2010 | Pattantyus et al. | ......... | 73/114.67 |
| 2007/0215130 A1 * | 9/2007 | Shelby et al. | ................. | 123/637 |
| 2010/0057324 A1 * | 3/2010 | Glugla et al. | ................. | 701/102 |

\* cited by examiner

*Primary Examiner* — Mahmoud Gimie
*Assistant Examiner* — David Hamaoui
(74) *Attorney, Agent, or Firm* — Julia Voutyras; Brooks Kushman P.C.

(57) ABSTRACT

Systems and methods for controlling an internal combustion engine include an ignition coil that generates a pre-discharge ionization signal during charging of the ignition coil after reaching a first threshold charge level and prior to spark discharge and a controller that determines an engine operating condition, such as pre-ignition or plug fouling, in response to the pre-discharge ionization signal. The ignition coil may also generate digital feedback and ionization signals used to by the controller for to control ignition coil dwell and repetitive sparking, as well as providing various combustion diagnostics.

9 Claims, 11 Drawing Sheets

IGNITION COIL WITH IONIZATION AND DIGITAL FEEDBACK FOR AN INTERNAL COMBUSTION ENGINE

BACKGROUND

1. Technical Field

The present disclosure relates to an ignition coil with ionization and digital feedback for control and diagnostics in an internal combustion engine.

2. Background Art

Manufacturers continue to improve control of internal combustion engines to enhance fuel economy and performance while reducing emissions using more sophisticated sensing and processing hardware and software. Ionization signal sensing (or ion sense) uses a bias voltage applied across a sensor positioned within the combustion chamber to generate a signal indicative of combustion quality and timing. Previous engine control strategies have used this signal to monitor or control the combustion process. The ionization signal is typically ignored or masked during spark discharge with the ionization waveform occurring after the spark discharge but during combustion analyzed for control and diagnostics, such as described in U.S. Pat. No. 6,865,929, for example. For spark-ignition engines, one or more spark plugs may be used as an ion sensor after the spark is generated to initiate combustion by applying a bias voltage across the air gap of the spark plug, or between a spark plug electrode and the cylinder wall.

Spark-ignited internal combustion engines may be configured with ignition systems that feature two or more spark plugs for each cylinder to accommodate flexible fuel applications, or to provide more ignition energy for leaner air/fuel ratios to improve combustion and enhance fuel economy, for example. Multiple spark plugs may be powered from a common ignition coil to improve cost effectiveness of these applications. However, multi-plug applications powered by a common ignition coil present various challenges for implementing ion sensing technology and ignition coil control and diagnostics. Likewise, single plug-per-cylinder applications that use a multiplexed or wired-OR arrangement having a single ignition control line for more than one cylinder present challenges for ion sensing and ignition coil control and diagnostics. For example, combining or summing feedback or ionization current signals from two or more spark plugs or other ion sensors on a common signal line may result in attenuation or cancellation of high frequency components and associated variation in the ion sensing signal that is difficult to correlate with actual combustion performance. Differences in spark durations between two or more spark plugs can mask ion signals for a portion of the engine cycle so that combustion information is unavailable. In addition, electrical and magnetic coupling of the spark discharge can also distort the ion sense signal. Systems and methods for addressing these issues using an isolation device are disclosed in commonly owned and copending U.S. patent application Ser. No. 11/929,949, the disclosure of which is incorporated by reference in its entirety. While suitable for many applications, systems and methods disclosed herein provide additional advantages relative to various prior art strategies.

SUMMARY

Systems and methods for controlling an internal combustion engine include an ignition coil associated with at least one cylinder that provides a pre-discharge ionization signal during charging of the ignition coil after reaching a threshold charge level but prior to spark discharge, and determines an operating condition, such as pre-ignition or a fouled plug, in response to the pre-discharge ionization signal. In one embodiment, the ignition coil provides a first digital signal in response to ignition coil charging that terminates when the threshold charge level is reached. In another embodiment, an ignition coil includes logic that generates a digital signal during a pre-discharge period to facilitate ionization signal monitoring of at least one other multiplexed coil connected via a common feedback signal line. In one embodiment, an ionization coil includes logic that provides at least two digital feedback signals to delineate four monitoring periods during each cylinder cycle including at least one ionization signal monitoring period to provide an indication of ignition coil dwell and spark duration in combination with combustion timing and quality.

The present disclosure includes embodiments having various advantages. For example, the present disclosure includes embodiments that allow detection of pre-ignition combustion or fouled plug conditions in applications having multiplexed feedback signals. Embodiments of the present invention may be used both in applications with multiple spark plugs per cylinder, and single plug-per-cylinder applications, having multiplexed feedback signals. Various embodiments of the present disclosure provide a digital feedback signal that can be used for ignition coil dwell control and diagnostics, as well as spark duration control and diagnostics. The present disclosure also includes embodiments that provide ignition coil dwell and spark duration feedback for use in controlling the number and duration of multi-strike or repetitive spark events during a single combustion cycle.

The above advantage and other advantages and features will be readily apparent from the following detailed description of the preferred embodiments when taken in connection with the accompanying drawings.

BRIEF DESCRIPTION OF THE DRAWINGS

Embodiments of the present disclosure described herein are recited with particularity in the appended claims. However, other features will become more apparent, and the embodiments may be best understood by referring to the following detailed description in conjunction with the accompanying drawings, in which:

DETAILED DESCRIPTION

Figure 1:
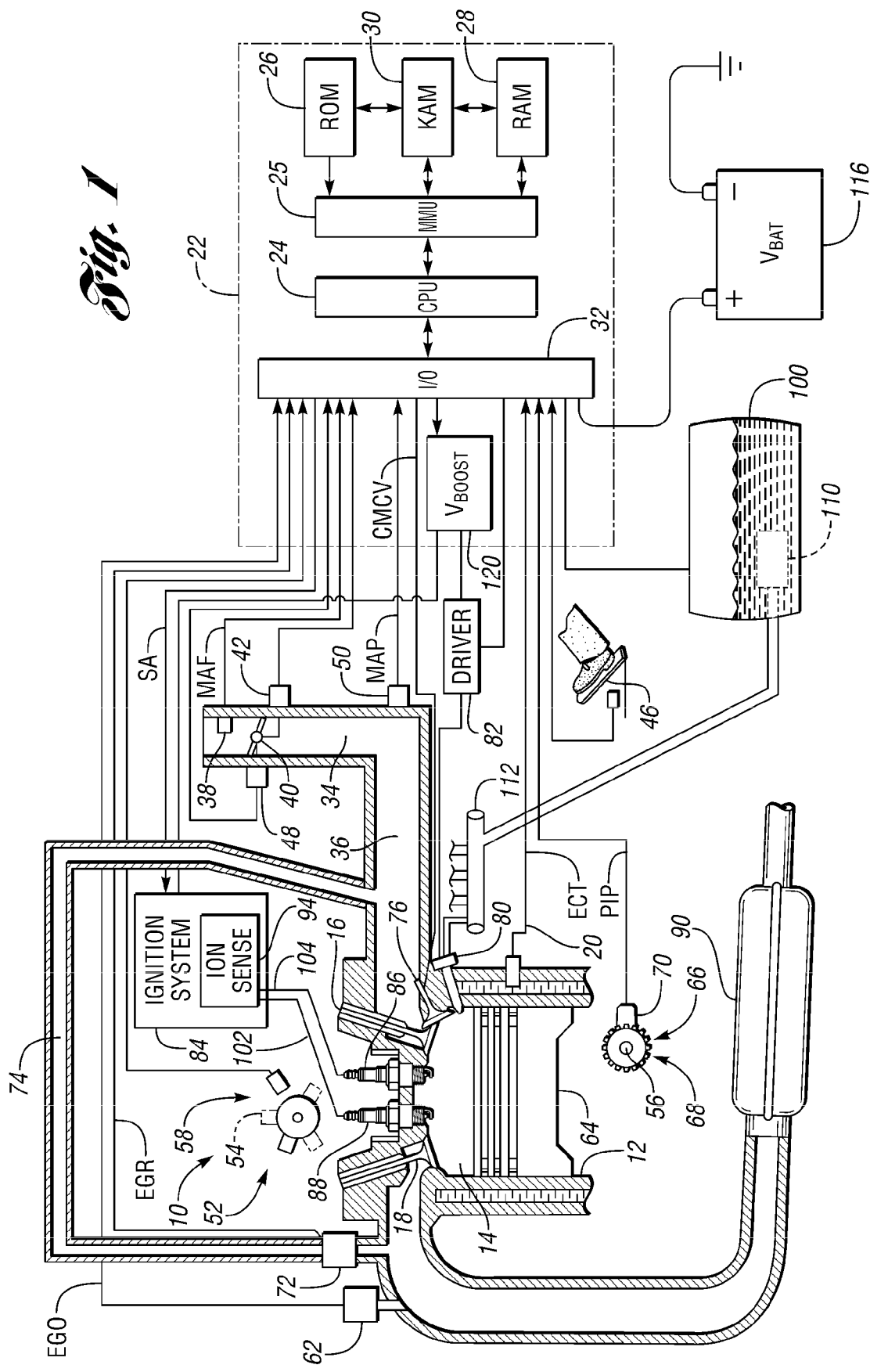
FIG. 1 is a schematic diagram illustrating one embodiment of a system or method for control and/or diagnostics using feedback signals from an ignition coil according to the present disclosure.

As those of ordinary skill in the art will understand, various features of the embodiments illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a multi-cylinder, internal combustion engine having at least one spark plug per cylinder that also functions as an ionization sensor. However, the teachings of the present disclosure may also be used in other applications. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22, sometimes referred to as an engine control module (ECM), powertrain control module (PCM), or vehicle control module (VCM), has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables, such as the fuel adjustment or correction values described herein, for example, while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like. Some controller architectures do not contain an MMU 25. If no MMU 25 is employed, CPU 24 manages data and connects directly to ROM 26, RAM 28, and KAM 30. Of course, more than one CPU 24 may be used to provide engine control and controller 22 may contain multiple ROM 26, RAM 28, and KAM 30 coupled to MMU 25 or CPU 24 depending upon the particular application. Likewise, various engine and/or vehicle control functions may be performed by an integrated controller, such as controller 22, or may be controlled in combination with, or separately by one or more dedicated purpose controllers.

In one embodiment, the computer readable storage media include stored data or code representing instructions executable by controller 22 to control a multiple cylinder internal combustion engine having at least one spark plug per cylinder with an associated ignition coil that provides digital feedback and ionization sensing. Embodiments may include a single plug per ignition coil, more than one spark plug per ignition coil, or multiple feedback signals combined on a single wire as described herein. The teachings of the present disclosure are independent of the particular location of the ignition coil relative to the associated spark plug(s) or engine controller.

The code stored in computer readable storage media includes instructions that analyze feedback signals from ignition coils for various diagnostic and control functions. In one embodiment, an ignition coil generates a pre-discharge ionization signal during charging of the ignition coil after reaching a first threshold charge level and prior to spark discharge. Controller 22 analyzes the signal to determine engine operating condition in response to the pre-discharge ionization signal as described in greater detail herein. In one embodiment, the code includes instructions that control the number and duration of repetitive spark discharges during a single combustion cycle in a single cylinder in response to first and second digital feedback signals from an associated ignition coil.

System 10 includes an electrical system powered at least in part by a battery 116 providing a nominal voltage, VBAT, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 may be provided in applications using direct injection and/or to provide the bias voltage for ion current sensing. Alternatively, ion sensing circuitry may be used to generate the bias voltage using the ignition coil and/or a capacitive discharge circuit as known.

In applications having a separate high-voltage power supply, power supply 120 generates a boosted nominal voltage, VBOOST, relative to the nominal battery voltage and may be in the range of 85V-100V, for example, depending upon the particular application and implementation. Power supply 120 may be used to power fuel injectors 80 and one or more ionization sensors, which may be implemented by at least one spark plug 86, 88, or by a dedicated ionization sensor that provides a feedback signal to controller 22. While FIG. 1 illustrates an application having two spark plugs 86, 88 per cylinder, the control systems and methods of the present disclosure are applicable to applications having only a single spark plug per cylinder, and to applications that may include one or more alternative sensors to provide an indication of combustion quality, timing, and diagnostics.

CPU 24 communicates with various sensors and actuators affecting combustion within cylinder 14 via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be actuated under control of CPU 24, through I/O interface 32, are fuel injection timing, fuel injection rate, fuel injection duration, throttle valve position, spark plug ignition timing, ionization current sensing and conditioning, charge motion control, valve timing, exhaust gas recirculation, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and/or exhaust valves 18 may be controlled using electromagnetic valve actuators to provide variable valve timing (VVT), using a variable cam timing (VCT) device to control intake and/or exhaust valve timing, or using a conventional camshaft arrangement, indicated generally by reference numeral 52. Depending upon the particular technology employed, air/fuel ratio within a cylinder or group of cylinders may be adjusted by controlling the intake and/or exhaust valve timing to control internal and/or external EGR or to control intake airflow, for example. In some applications, mixing of inducted air and fuel may be enhanced by control of an intake manifold runner control device or charge motion control valve 76. In the embodiment illustrated in FIG. 1, camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54, or controller 22 in a variable cam timing or camless VVT engine application, controls one or more exhaust valves 18 to exhaust the combusted air/fuel mixture through an exhaust manifold. A portion of the exhaust gas may be redirected by exhaust gas recirculation (EGR) valve 72 through an EGR circuit 74 to intake 36. Depending upon the particular application and implementation, external recirculated exhaust gas may flow through an EGR cooler (not shown) and implemented as high-pressure and/or low-pressure EGR in boosted applications. EGR valve 72 may be controlled by controller 22 to control the amount of EGR based on current operating and ambient conditions.

A sensor 58 provides a signal from which the rotational position of the camshaft can be determined. Cylinder identification sensor 58 may include a single-tooth or multi-tooth sensor wheel that rotates with camshaft 54 and whose rotation is detected by a Hall effect or variable reluctance sensor. Cylinder identification sensor 58 may be used to identify with certainty the position of a designated piston 64 within cylinder 12 for use in determining fueling, ignition timing, and/or ion sensing, for example. Additional rotational position information for controlling the engine is provided by a crankshaft position sensor 66 that includes a toothed wheel 68 and an associated sensor 70.

An exhaust gas oxygen sensor 62 provides a signal (EGO) to controller 22 indicative of whether the exhaust gasses are lean or rich of stoichiometry. Depending upon the particular application, sensor 62 may by implemented by a HEGO sensor or similar device that provides a two-state signal corresponding to a rich or lean condition. Alternatively, sensor 62 may be implemented by a UEGO sensor or other device that provides a signal proportional to the stoichiometry of the exhaust feedgas. This signal may be used to adjust the air/fuel ratio in combination with information provided by the ionization sensor(s) as described herein. In addition, the EGO signal may be used to control the operating mode of one or more cylinders, for example. The exhaust feedgas is passed through the exhaust manifold and one or more emission control or treatment devices 90 before being exhausted to atmosphere. A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. Fuel tank 100 may include one or more associated sensors (not shown) for determining fuel level and/or pressure within fuel tank 100.

In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the teachings of the present disclosure may also be used in applications having fuel injector 80 centrally mounted through the top or roof of cylinder 14, or with a port-injected configuration, for example. Likewise, some applications may include a combination port/direct injection arrangement. Driver 82 may include various circuitry and/or electronics to selectively supply power from high-voltage power supply 120 to actuate a solenoid associated with fuel injector 80 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle.

At the appropriate time(s) during the combustion cycle, controller 22 generates control signals (SA) processed by ignition system/coil 84 to individually control at least one spark plug 86, 88 associated with a single cylinder 12 during the power stroke of the cylinder to initiate or enhance combustion within chamber 14. Ignition system/coil 84 generates various feedback signals that are processed by controller 22 and/or other controllers to perform various diagnostic and control functions. Controller 22 and/or ignition system/coil 84 applies a high-voltage bias across at least one spark plug 86, 88 at appropriate times during the combustion cycle to enable pre-discharge and/or post-discharge ionization signal sensing to provide combustion quality feedback for control and diagnostics. Depending upon the particular application, the high-voltage bias may be applied across the spark (air) gap or between the center electrode of spark plug 86, 88 and the wall of cylinder 12.

As previously described, controller 22 processes feedback signals from ignition system/coil 84 and performs various diagnostic and control functions, such as determining a fouled spark plug, misfire, pre-ignition, coil anomaly, or controlling repetitive sparking during a single combustion cycle within a single cylinder, for example. Various embodiments may include additional controllers that process diagnostic and control signals associated with one or more spark plugs 86, 88. For example, a micro-controller and/or dedicated electronics may be integrated into one or more of the ignition coils to process feedback signals and generate control signals. A master ignition coil may coordinate communication and control between associated slave ignition coils and a master and/or slave controller, such as controller 22. Various communication protocols, such as a CAN network, may be used for distributed processing of various functions or sub-functions associated with the control and feedback of the various ignition coils 84. In some embodiments, designated master ignition coils may contain significant processing capability and associated control logic. The ignition coil control and feedback functionality described herein is independent of the particular processing topology or distribution.

As shown in FIG. 1, ignition system/coil 84 may include an ion sense circuit 94 associated with one or both of the spark plugs 86, 88 in one or more cylinders 12. Ion sense circuit 94 operates to selectively apply a bias voltage to at least one of spark plugs 86, 88 at appropriate times during the combustion cycle to generate a corresponding ion sense signal as shown by the representative ionization sensing signals of the Figures. Analysis by controller 22 of the feedback signals from ignition system/coil 84, including ionization sensing signals and digital feedback signals, may be used to determine one or more engine operating conditions including combustion quality and air/fuel ratio of the combustion event, for example. The ion sense signal may be used by controller 22 for various diagnostic and combustion control purposes by processing at least one characteristic of the ion sense signal, such as peak value, duration, integral, timing, etc.

Controller 22 includes code implemented by software and/or hardware to control system 10. Controller 22 generates signals to initiate coil charging and subsequent spark discharge for at least one spark plug 86, 88 and monitors the ionization sensing signal at various points during the combustion process as described herein for at least one spark plug 86, 88. The ionization sensing signal may be used to provide information relative to combustion quality to manage fuel economy, emissions, and performance in addition to detecting various conditions that may include engine knock, misfire, pre-ignition, etc.

Figure 2:
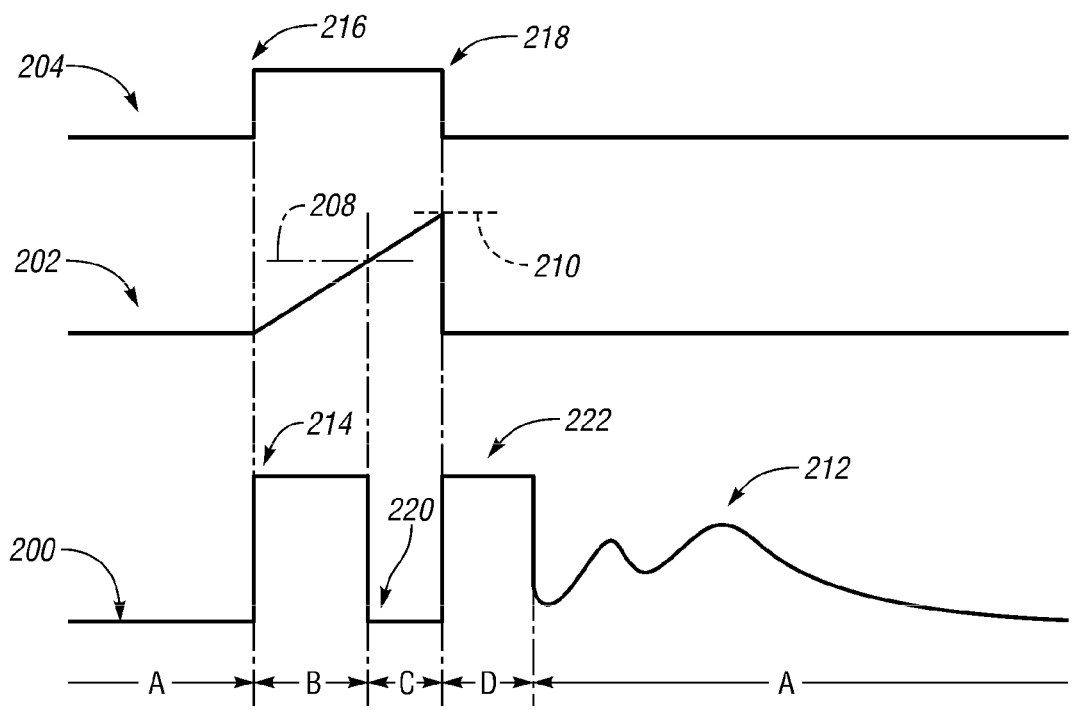
FIG. 2 illustrates ideal feedback signals from an ignition coil according to one embodiment of the present disclosure.

FIG. 2 illustrates representative feedback signals from an ionization ignition coil/ignition system 84 (FIG. 1). Feedback signal 200 illustrates a representative feedback signal incorporating ionization sensing and digital feedback signals according to one embodiment of the present disclosure. According to the present disclosure, feedback signal 200 is provided to controller 22 (FIG. 1) and analyzed during at least four time periods A, B, C, and D of the combustion cycle. As understood by those of ordinary skill in the art, time periods A-D are generally event-driven intervals that vary in duration based on engine operation and may be measured by various parameters, such as crank angle degrees, for example. For analysis of ionization sensing portions of feedback signal 200, real-time acquired ion sense signals for each engine cylinder for each spark plug or other ionization sensor are gathered and stored by controller 22 (FIG. 1). For each combustion event, at each spark plug, the information for the most recent engine cylinder firing may be processed to identify various signal characteristics or features indicative of combustion quality and air/fuel ratio such as peak values, signal integral areas, derivative or slope values, statistics (such as maximum, minimum, mean, or variability) based on these values, or crankshaft locations (timing values) for any of the values or statistics to determine combustion quality and diagnostics. The particular feature or characteristic(s) of the ionization sensing portion of the feedback signal used to determine combustion quality and diagnostics may vary by application and implementation. The ion signals for each ignition coil in a shared cylinder are sampled at a given time or crankshaft degree intervals relative to expected ignition timing as described herein. These curve features, time-based, and/or angle-based measurements can be averaged to remove statistically random components of the pre-discharge and/or post-discharge ionization sensing signal if desired.

As used herein, ionization sensing signals may include the signal corresponding to an individual combustion event, or to a statistically averaged signal for a particular sensor, cylinder, cycle, etc. Generally, sufficient numbers of samples, or cylinder event series of samples, are used to ensure statistical significance for all measurements. These measurements may be collected in one group or in a one-in, one-out, sliding window fashion. The data elements representing one or more series of measurements may be processed to produce a regression equation once the sample size is appropriate for the desired statistical significance. These regression equations and/or transfer functions can then be used to estimate either historical or instantaneous engine combustion quality/stability and provide various other diagnostics. The regression equation and or transfer function may be periodically updated for the desired level of accuracy. One skilled in the art will also recognize that other systems such as neural networks could be utilized to ascertain information from the ionization sensing portion of the feedback signals. When the engine operating time has been sufficient to allow for valid combustion stability measurements by means other that ionization sensing, these values can be used to calibrate the accuracy of the combustion stability estimate based on ionization sensing.

FIGS. 2-21 illustrate representative feedback signals from an ignition coil 84 associated with at least one spark plug 86, 88 or other ionization sensor during a representative combustion cycle. Ignition coil feedback signal 200 is analyzed during one or more intervals A-D to provide various diagnostic and control information for the corresponding combustion cycle of an associated cylinder, or generally across a group of cylinders or all cylinders. In the various embodiments illustrated, portion or period "A" of feedback signal 200 is analyzed for an analog ionization current signal 212 that generally provides cylinder combustion information as explained in greater detail below. The ignition coil generates a first digital feedback signal 214 in response to a coil charging control signal 204 being asserted at 216 and continuing until an ignition coil charging signal 202 reaches a first threshold charge level 208, which may be referred to as a partial ignition coil dwell flag point. In one embodiment, the partial dwell flag threshold 208 is set to about 85% of full dwell 210, with full dwell determined by control signal 204 transitioning to an unasserted state at 218. During normal operation, full dwell is sufficient to initiate spark discharge across the associated spark plug(s). However, actual spark discharge may begin before or after the full dwell point depending on the current operation conditions within an associated cylinder. Portion "B" may be analyzed and used in closed loop dwell current control and/or for ignition coil diagnostics as explained in greater detail below.

Figure 3:
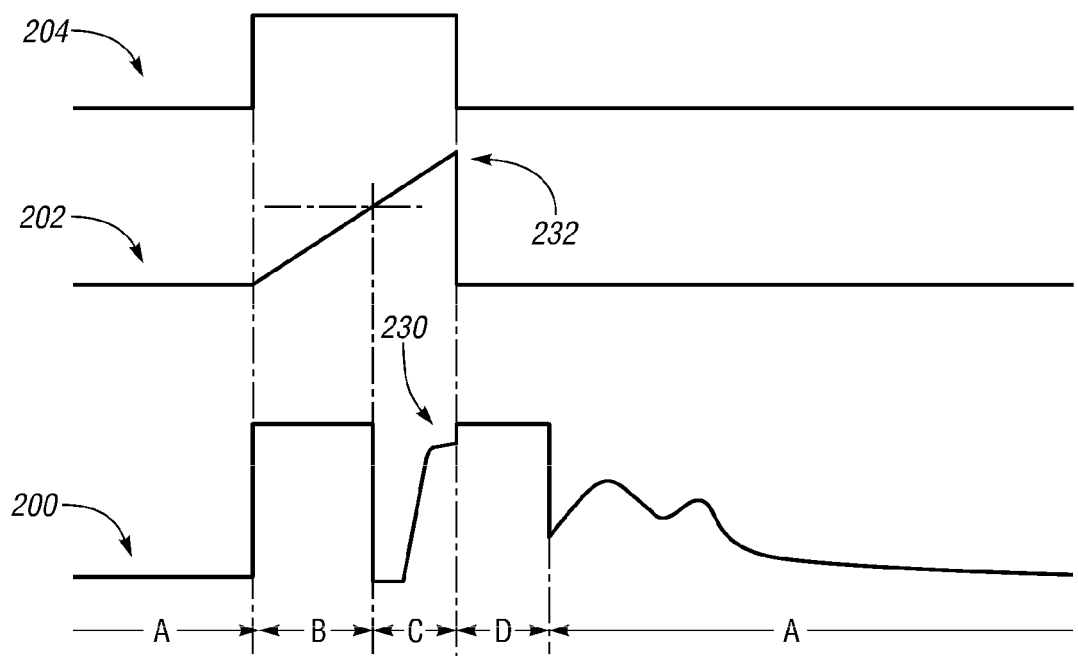
FIG. 3 illustrates one embodiment of an ignition coil feedback signal used to detect pre-ignition prior to spark discharge according to the present disclosure.

With continuing reference to the representative signals illustrated in FIGS. 2-21, portion or period "C" of feedback signal 200 begins when the ignition coil primary current 202 reaches first threshold 208 and ends at the end of dwell 210, or the initiation of spark discharge. The present disclosure includes alternative embodiments with respect to period "C", with the first group of embodiments represented in FIG. 2 where the ignition coil generates a second digital feedback signal 220, which may be asserted "Hi" or "Lo" depending on the particular application and implementation. Operation of a second group of embodiments is illustrated and described with respect to FIG. 3, with an analog ionization signal monitored during period "C" to provide pre-ignition detection. In the embodiment of FIG. 3, period "C" is similar to period "A" except the ionization signal may have an apparent higher gain during period "C" associated with a higher voltage at the spark plug during dwell (sometimes referred to as feed forward voltage) than during period "A", which occurs after spark discharge. During period "A", the voltage at the spark plug depends upon the ion power supply voltage in the ignition coil, whereas during period "C" the ionization voltage depends upon the turns ratio of the ignition coil and the primary battery voltage. The higher voltage results in a higher ion current and therefore an increase in output signal level.

A second digital feedback signal 222 is generated by the ignition coil during period "D" in response to the ignition coil secondary current being above the spark discharge level and no coil charging control signal 204 being present (asserted). Period "D" spans the spark discharge event as determined by a measure of the ignition coil secondary current. Period "A" follows period "D" and the ignition coil generates a combustion ionization signal after the digital feedback signal of period "D" as previously described.

FIG. 3 illustrates a representative ignition coil feedback signal that may be used to detect pre-ignition. As generally understood by those of ordinary skill in the art, pre-ignition occurs when the air-fuel mixture in the cylinder is ignited prematurely, i.e. prior to spark discharge, by glowing deposits or hot surfaces inside the combustion chamber, for example. As previously described, a first alternative embodiment of a system or method according to the present disclosure includes an ignition coil that generates a pre-discharge ionization signal 230 on the ignition coil feedback line 200 during period "C" (rather than a digital signal as shown in FIG. 2). This pre-discharge ionization signal is analyzed by controller 22 for one or more signal characteristics, such as voltage level, rate of change or slope of the voltage level, and position (crank angle) of peak voltage, for example. If the pre-ignition within the combustion chamber occurs before the spark event generated by the ignition system, a non-zero and rapidly rising ionization current signal will be detected in period "C" as generally represented by ionization signal 230. The spark event generated by the ignition system may be determined by monitoring the coil dwell signal 204 and primary current or charge signal 202. In FIG. 3, signal peak 230 occurs prior to the normal firing current 232, and has a slope exceeding a corresponding threshold such that a pre-ignition condition is indicated. In response to detecting a pre-ignition condition, controller 22 may take appropriate mitigating action during subsequent combustion cycles.

Figure 4:
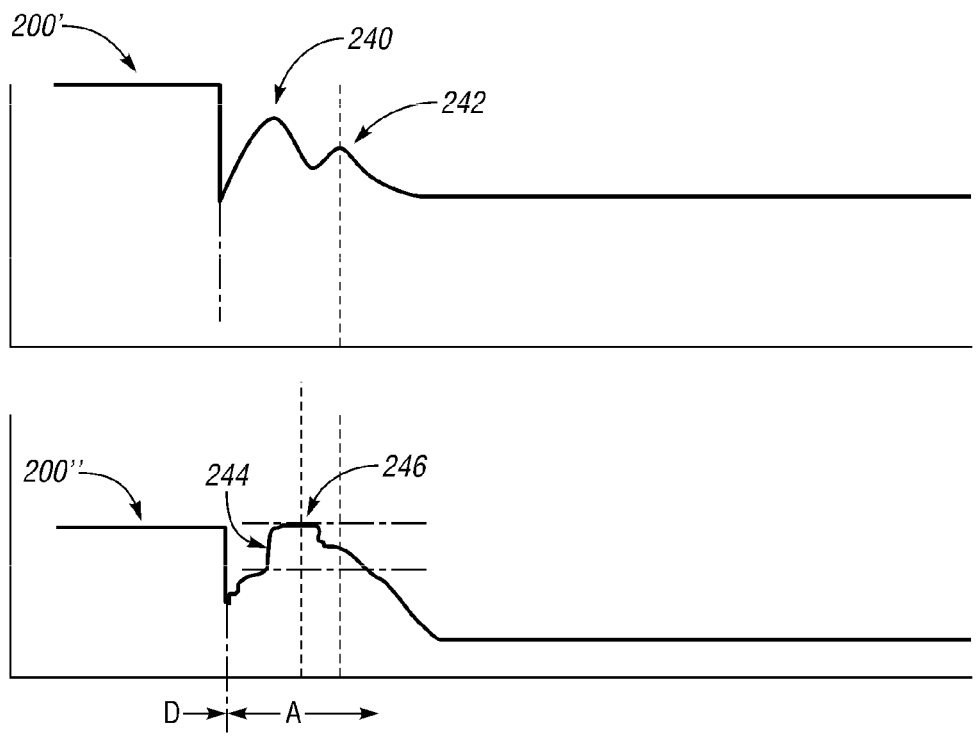
FIG. 4 illustrates feedback signals for detection of pre-ignition after spark discharge according to one embodiment of the present disclosure.

The signals illustrated in FIG. 4 represent operation of a system or method according to the present disclosure for detecting combustion quality, and in particular for detecting pre-ignition that is not detected during period "C" as described with reference to FIG. 3. Feedback signals 200' and 200" of FIG. 4 include digital and analog portions or segments with a second digital feedback signal during period "D" and an analog ionization signal during period "A". Feedback signal 200' depicts a representative combustion event with spark discharge occurring during digital feedback period "D" and an ionization current signal during analog feedback period "A". Feedback signal 200' includes a first peak 240 and a second peak 242 typical of good quality combustion. Feedback signal 200" includes an ionization current portion typical of pre-ignition occurring at an ignition site within the cylinder that is too far away from the spark plug for the flame front to reach the spark plug prior to spark discharge, such that pre-ignition is not detected during period "C" as described with reference to FIG. 3. Furthermore, during spark discharge (period "D"), the ionization signal is masked. However, according to the present disclosure, pre-ignition is detectable under these conditions by analysis of the ionization signal during the subsequent period "A". As a comparison of the waveforms of feedback signals 200' and 200" demonstrates, signal 200" has a higher (steeper) slope 244 than the corresponding slope of first peak 240 of signal 200' immediately after the end of spark discharge (even after noise spikes are filtered). In addition, a large increase in ionization signal level (which may include signal saturation as illustrated), and a waveform peak 246 that occurs at an early crank angle relative to the expected location of peak 242 of signal 200' may be used to detect pre-ignition according to the present disclosure. Of course, various other signal characteristics may be used in determining the combustion quality and/or detecting pre-ignition as previously described.

Figure 5:
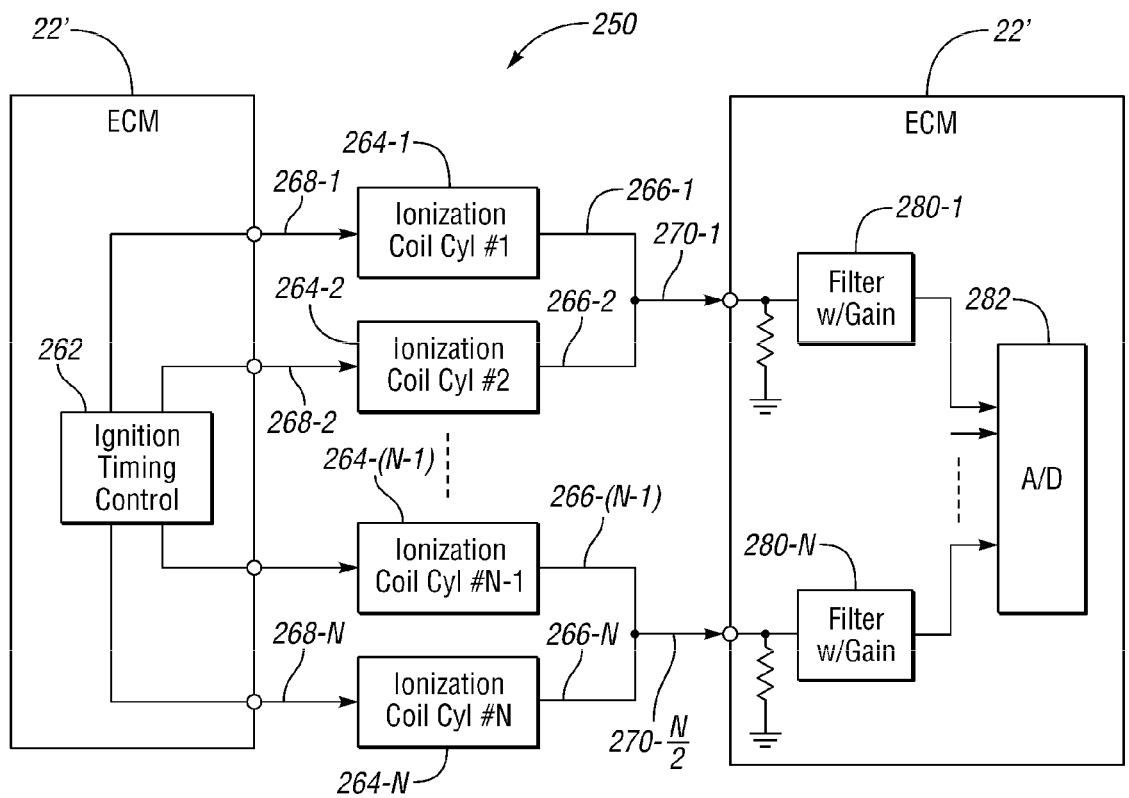
FIG. 5 is a block diagram illustrating a system having multiplexed or wired-OR ignition coil feedback signals according to one embodiment of the present disclosure.

FIG. 5 is a block diagram illustrating operation of a system or method for providing feedback signals from wired-OR (common wire) ignition coils according to the present disclosure. System 250 includes an engine control module (ECM) 22' as previously described with reference to FIG. 1 and illustrated in two separate blocks for convenience only. ECM 22' includes an ignition timing control module 262 in communication with ionization coils 264-1 to 264-N each associated with one of the cylinders in the engine. Each ionization coil or coil assembly 264-1 to 264-N may be associated with one or more spark plugs associated with a corresponding cylinder as illustrated and described with reference to FIG. 1. In this embodiment, the outputs of two or more coils are connected together via wire-OR methods or similar methods where outputs are multiplexed or summed together. As shown in FIG. 5, feedback signals 266-1 and 266-2 from at least a first ionization coil assembly 264-1 and a second ionization coil assembly 264-2, respectively are OR'd, summed, combined, multiplexed, etc. and transmitted or communicated by a single common feedback wire 270-1 to ECM 22'. The combined feedback signal is filtered by a corresponding hardware and/or software filter with gain 280-1 and sampled by an analog/digital converter (A/D) 282 before being processed by ECM 22' as described herein. In this embodiment, a pre-discharge analog ionization signal is provided during period "C" (rather than a third digital feedback signal) as previously described with reference to FIG. 3, which facilitates identification of which cylinder is associated with the common feedback signal. As such, it is possible to determine the operating condition of a spark plug associated with either the first ignition coil (e.g. 264-1) or the second ignition coil (e.g. 264-2) in response to the pre-discharge ionization signal on the common wire (e.g. 270-1) as demonstrated by the representative signals illustrated in FIGS. 6 and 7. Those of ordinary skill in the art will recognize that the teachings of the present disclosure may be adapted to applications having a single or multiple spark plugs per ignition coil and/or more than two coil feedback signals combined on a single common input to the ECM.

Figure 6:
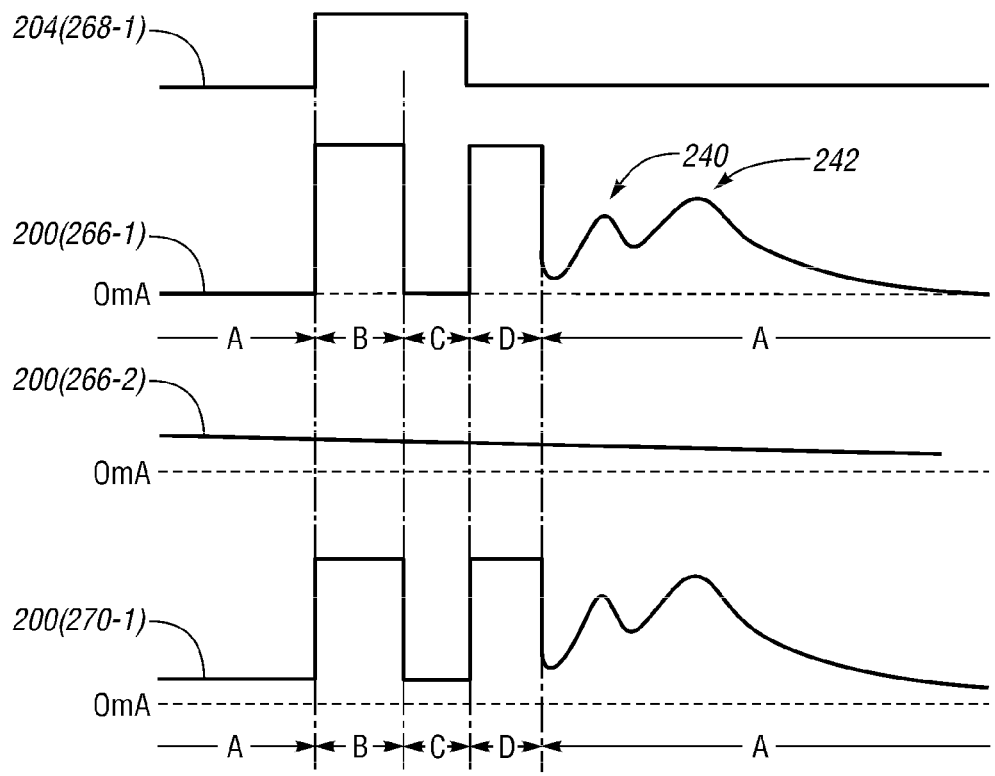
FIG. 6 illustrates feedback signals for a multiplexed system used to detect a fouled spark plug on a non-firing cylinder according to one embodiment of the present disclosure.

FIG. 6 illustrates feedback signals for a multiplexed system having feedback from two or more ignition coils communicated to the ECM on a common wire with a fouled plug within a non-firing (second) cylinder. Control signal 204 is provided to a first ionization coil 264-1 on a corresponding control line 268-1 with spark discharge for cylinder #1 occurring during period "D". The feedback signal 200 on line 266-1 (before being combined) indicates a typical firing cycle with first and second digital feedback portions during periods "B" and "D", and ionization sensing signals during periods "A" and "C". The ionization signal during combustion (period "A") includes first and second peaks 240, 242 indicating good combustion in cylinder #1. The feedback signal 200 on line 266-2) associated with non-firing cylinder #2 is generated by leakage current passing through a fouled plug in cylinder #2. The combined feedback signal 200 on line 270-1 has a higher signal level or gain at least during period "C" due to the feed-forward voltage and associated leakage current contribution of the non-firing spark plug associated with cylinder #2. As such, the ECM can determine the operating condition of the spark plug associated with the second ignition coil (264-2) in response to the pre-discharge ionization feedback signal 200(270-1) from the combined feedback signal on the common wire 270-1 during period "C".

Figure 7:
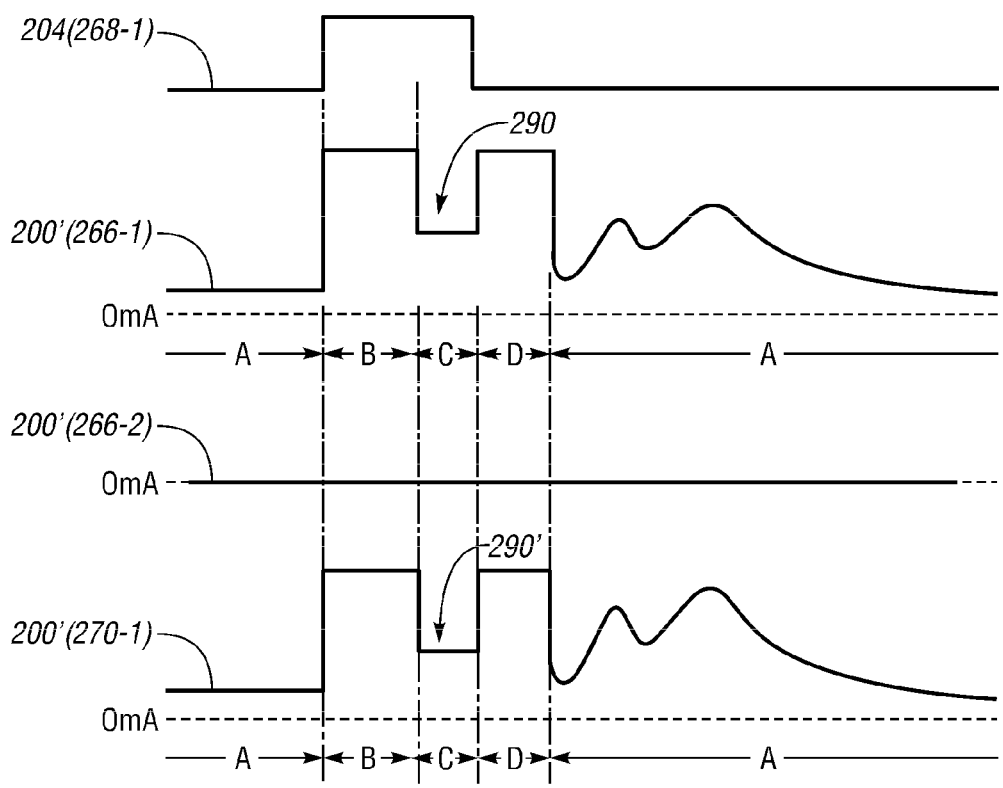
FIG. 7 illustrates feedback signals for a multiplexed system used to detect a lightly fouled spark plug on a firing cylinder according to one embodiment of the present disclosure.

FIG. 7 illustrates feedback signals for a multiplexed system used to detect a lightly fouled plug on a firing cylinder according to one embodiment of the present disclosure. Control signal 204 is supplied to cylinder #1 via control line 268-1, for example. Feedback signal 200'(266-1) includes an ionization current 290 during period "C" that exhibits a higher gain (as compared to 200(266-1) of FIG. 6) indicating a lightly fouled, but still firing, spark plug. Because there is no leakage current contribution from cylinder #2 as indicated by line 200'(266-2), the combined feedback signal 200'(270-1) exhibits the same higher gain and may be used by controller 22 to determine fouling of the spark plug associated with the second (firing) ignition coil in response to the pre-discharge ionization signal 290 on the common wire 270-1 exceeding a corresponding plug fouling threshold. Thus, as shown in FIGS. 6 and 7, the higher signal level during period "C" demonstrates that even under lightly fouled (but still firing) plug conditions, the present disclosure facilitates detection of a lightly fouled plug, identification of which plug is fouled in a multiplexed or combined feedback configuration, and initiation of mitigating actions for that plug and/or cylinder. Those of ordinary skill in the art will recognize that this strategy can be adapted for applications having more than two output feedback signals connected together with wire-or methods or similar methods for signal summation consistent with the teachings of the present disclosure.

Figure 8:
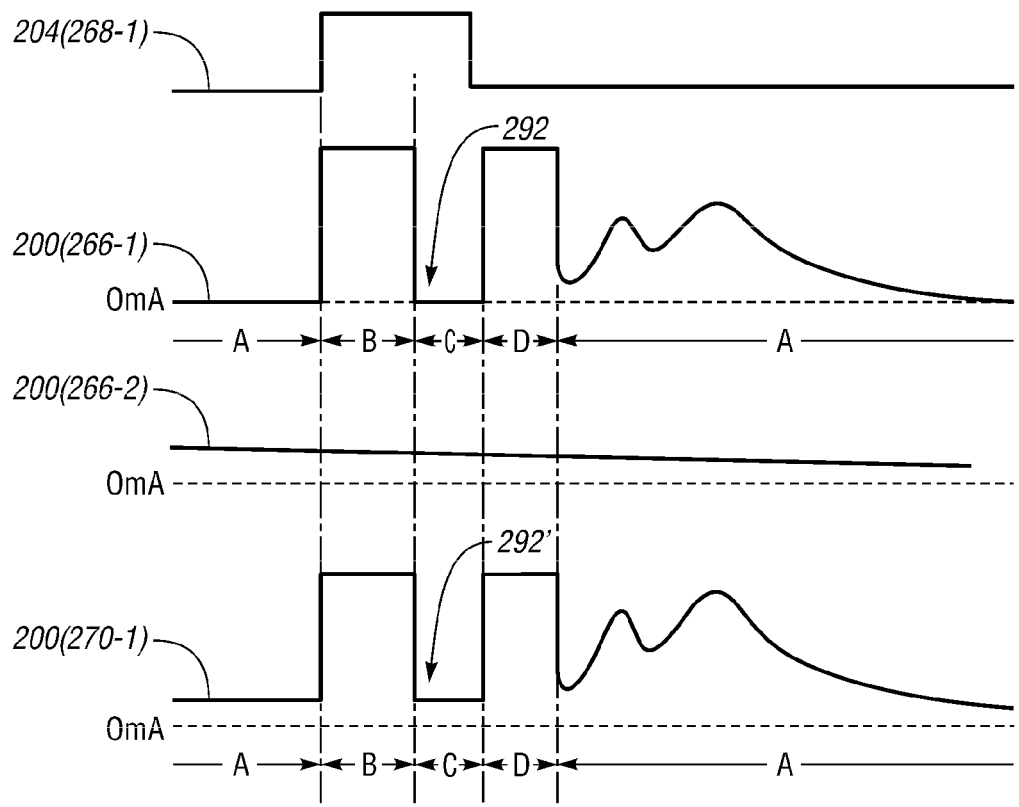
FIG. 8 illustrates feedback signals in an alternative implementation of a multiplexed system having a third digital feedback signal during pre-discharge used to detect a fouled spark plug according to one embodiment of the present disclosure.

FIG. 8 illustrates feedback signals in an alternative implementation of a multiplexed system having a third digital feedback signal during pre-discharge period "C" used to detect a fouled spark plug according to one embodiment of the present disclosure. In applications where two or more feedback signals are connected together via wire-OR methods or similar signal summation methods as generally illustrated in FIG. 5, and detection of pre-ignition is not a concern during pre-discharge period "C", the alternative embodiment of FIG. 8 provides a third digital feedback signal 292 during period "C" for the firing spark plug to facilitate identification of the cylinder having a fouled spark plug (during the non-firing portion of combustion cycle for the fouled plug). As shown in FIG. 8, spark plug control signal 204 for a first ignition coil is provided on line 268-1 (FIG. 5). Feedback signal 200 on line 266-1 corresponds to the firing cylinder feedback signal. Feedback signal 200 (266-2) corresponds to another cylinder with feedback signals combined on line 270-1, for example, with the combined signal represented by feedback 200(270-1). During period "C", a third digital feedback signal 292 is provided on representative feedback line 200(266-1) for the firing spark plug. In the illustrated embodiment, the digital feedback signal is a logic "low" or zero volts. Other embodiments may include a feedback signal with a logic "high" signal during this period. Fouling of the spark plug associated with the second ignition coil results in a leakage current through the corresponding spark plug as represented by the associated feedback line 200(266-2), for example, causing a non-zero current on the feedback signal. As shown in FIG. 8, the controller can analyze the feedback signal during period "C" as a reference level to determine if there is any non-zero feedback current from the corresponding cylinders during the combustion cycle when they are not commanded to fire, i.e. when there is no associated charging signal 204. In this manner, the spark plug contribution of each cylinder can be identified and used to determine which cylinder associated with a combined feedback line has a fouled spark plug. As illustrated in FIG. 8, the combined signal 200(270-1) is analyzed at least during period "C" to detect a fouled plug on the non-commanded cylinder, with a fouled plug indicated by the elevated level 292' exceeding a corresponding threshold.

Figure 9:
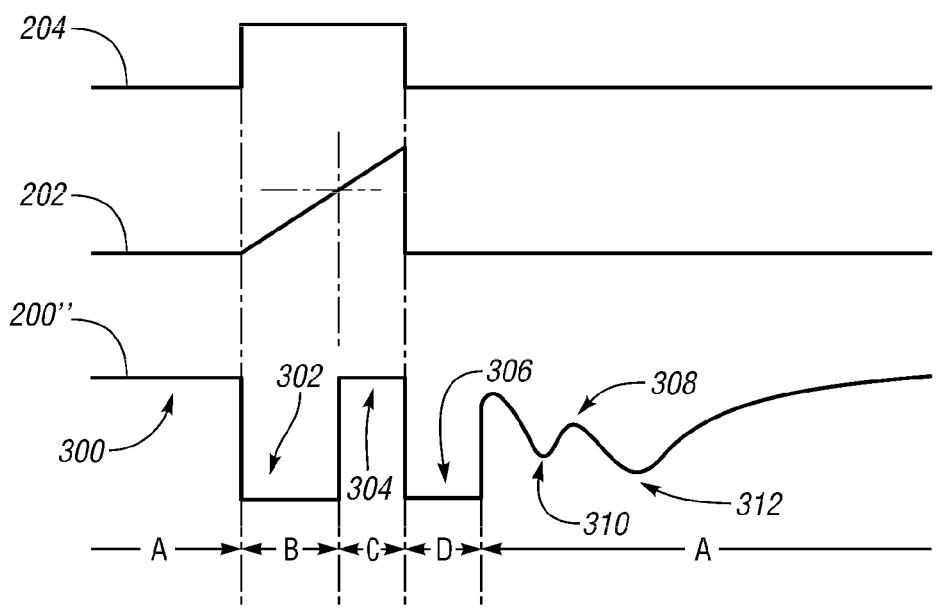
FIG. 9 illustrates feedback signals with an alternate signal level or polarity according to one embodiment of the present disclosure.

FIG. 9 illustrates feedback signals with an alternate signal level or polarity according to one embodiment of the present disclosure. As previously described, digital feedback signals may be generated with a logic "low" generally corresponding to zero volts or amps, or a logic "high" corresponding to a predetermined voltage of 5V, or 12V, for example Likewise, the analog portion of the feedback signal that carries ionization current information 308 may be inverted as illustrated. This form of feedback signal provides an alternative solution for various applications and/or implementations while presenting equivalent information in the feedback waveform. As illustrated in FIG. 9, the control signal 204 and ignition coil charging signal 202 remain unchanged. However, feedback signal 200" has a waveform similar to those previously described except that its polarity has been reversed. The output will stay high if there is no ion current detected in the combustion chamber as indicated at 300. Similarly the other periods are also of the opposite polarity with periods "B" and "D" being "low" as indicated at 302 and 306, respectively, and periods "C" being "high" as indicated at 304. The ionization current signal 308 during period "A" is inverted, i.e. has reversed polarity. As such, the analysis of the combustion information is adjusted accordingly to determine combustion information. For example, signal thresholds are adjusted accordingly and the signal troughs 310, 312 analyzed rather than the signal peaks as previously described to determine combustion information.

Those of ordinary skill in the art will recognize that other alternative strategies may be used to present the same information. For example, the transition from period "B" to period "C" could be indicated by a fixed pulse of short duration rather than spanning the entire period. Other variations are possible, however it is desirable to have portion "C" available for ion current detection in many applications.

Figure 10:
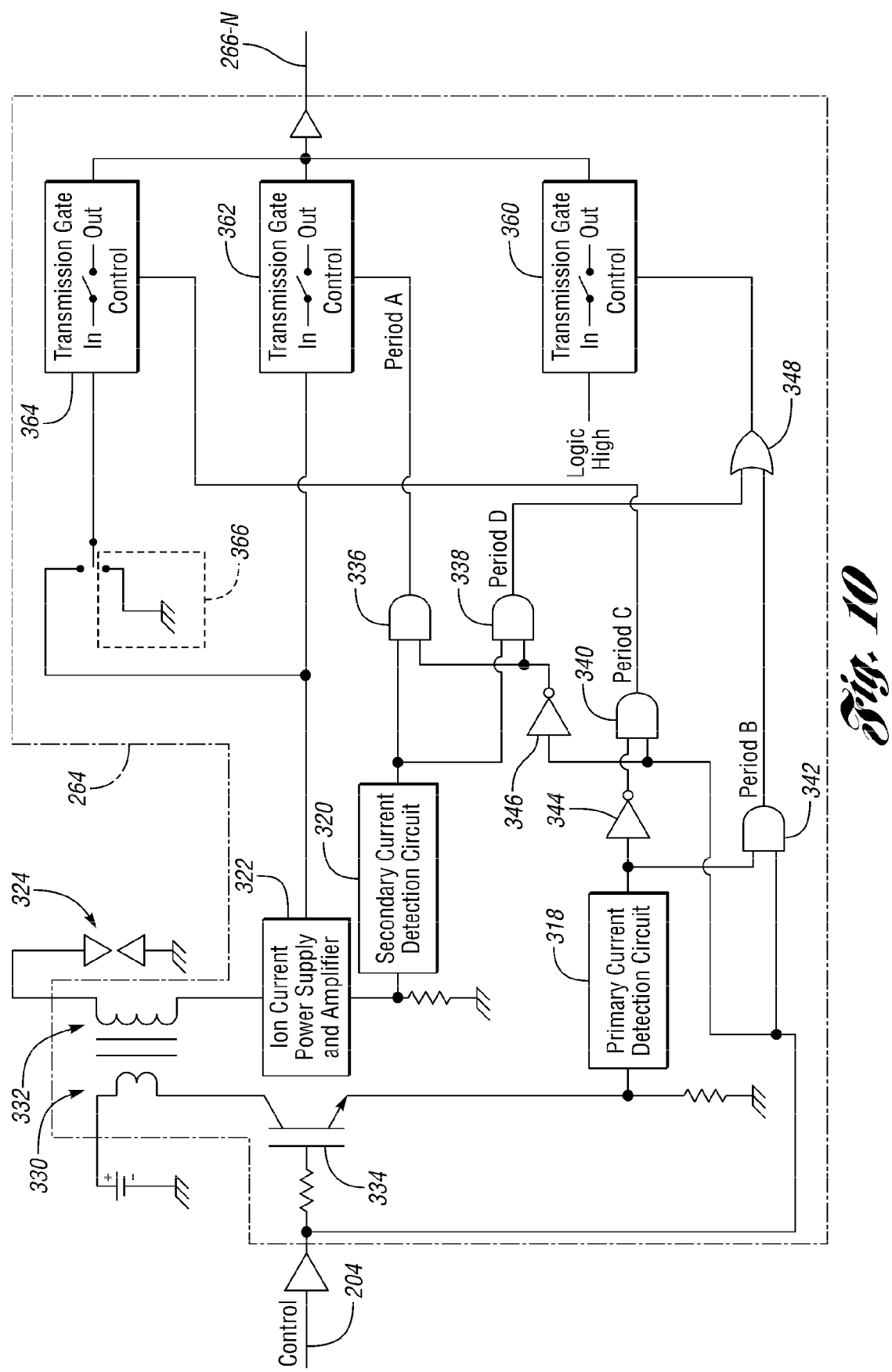
FIG. 10 is a schematic diagram of an ignition coil with ionization sensing and digital feedback according to one embodiment of the present disclosure.

FIG. 10 is a schematic diagram of an ignition coil with ionization sensing and digital feedback according to one embodiment of the present disclosure. Ionization coil 264 contains integral electronics 318, 320 that sense current through ignition coil primary 330 and secondary 332, respectively. Ion current power supply and amplifier 322 generates a bias voltage at spark plug 324 during period "A" and optionally during period "C" as previously described to produce an ionization sensing current and filter and/or amplify the ion current before being supplied to the controller. Control signal line 334 from the engine controller initiates the ignition coil dwell to charge coil 264. The control signal controls operation of IGBT 334 that in turn controls primary current, which is detected at 318 and used to form the feedback signal on line 266-N as determined by ignition coil control logic, which is represented by various logic gates and inverters 336-348. The source of the feedback output waveform is selected from several internal signals via logic functions based on the state of control signal 204 and the magnitude of the primary and secondary currents as detected by electronics 318 and 320.

As illustrated in FIG. 10, a coil command signal of "high" on line 204 initiates charging of coil 264 with primary current detected at 318. Gates 340 and 342 are asserted or energized, as well as gate 348, indicating that the combustion cycle is in period "B" or period "C". Period "B" is indicated while primary current is below the dwell threshold and the output of block 318 is asserted. During period "B", gate 360 is asserted and provides a logic "high" to the feedback output line 266-N. Once the dwell threshold is reached, primary current detection circuit 318 is unasserted with inverter 344 activating gate 340 and transmission gate 364. Depending upon the particular application, period "C" may provide an ionization sensing signal through gate 364 to output 266-N, or optionally provide a logic "low" as represented by block 366. Period "D" is initiated when coil dwell control 204 is unasserted and block 320 detects secondary current above a corresponding spark discharge threshold such that gates 338 and 360 are energized. Similar to period "B", gate 360 provides a logic "high" to output 266-N to mask the spark discharge. Period "A" is initiated after spark discharge when secondary current detection circuit 320 detects secondary current below a corresponding threshold to activate gate 336 and 362 to provide the ionization sensing signal to output 266-N.

Figure 11:
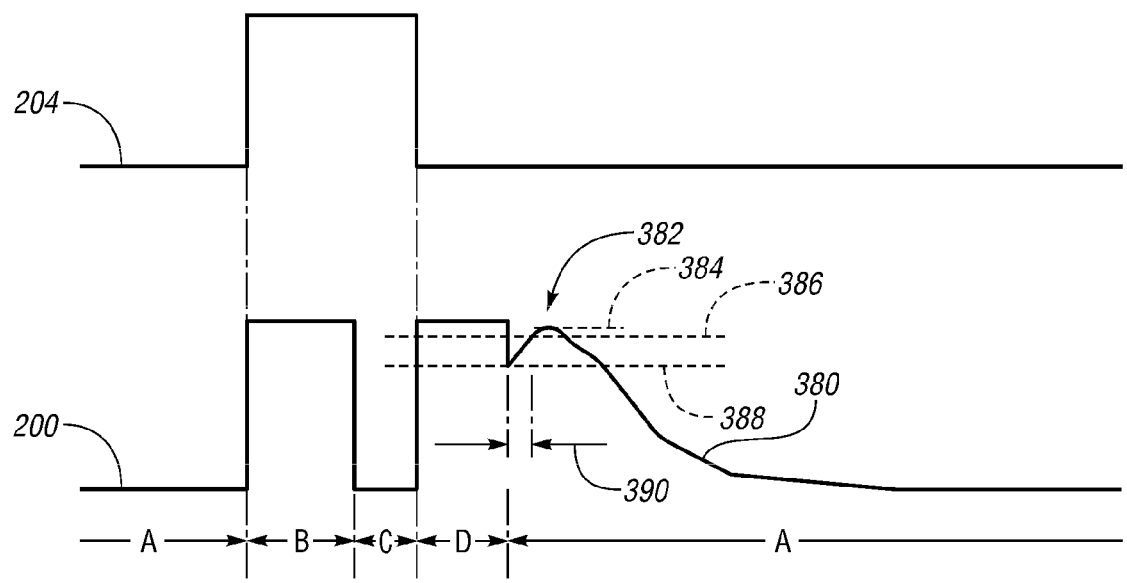
FIG. 11 illustrates a feedback signal for detection of end of spark at high engine speeds according to one embodiment of the present disclosure.

FIGS. 11-20 illustrate representative feedback signals that may be analyzed by controller 22 for control and diagnostic purposes. FIG. 11 is a representative feedback signal for detection of end of spark at high engine speeds according to one embodiment of the present disclosure. Under some conditions, spark duration can mask the flame front portion of the ionization current waveform and there can be a high ion current 380 with a peak 382 having a peak pressure 384 that reaches or exceeds the threshold level 386 used to determine the end of the spark duration pulse. Under these conditions, the end of spark duration and the beginning of the ionization waveform can be determined by detecting the maximum ion current 388 at the end of spark dropping below the spark duration threshold 386 for some period of time 390. This is due to resonance within the ignition coil with the coil "ringing out" its remaining energy.

Figure 12:
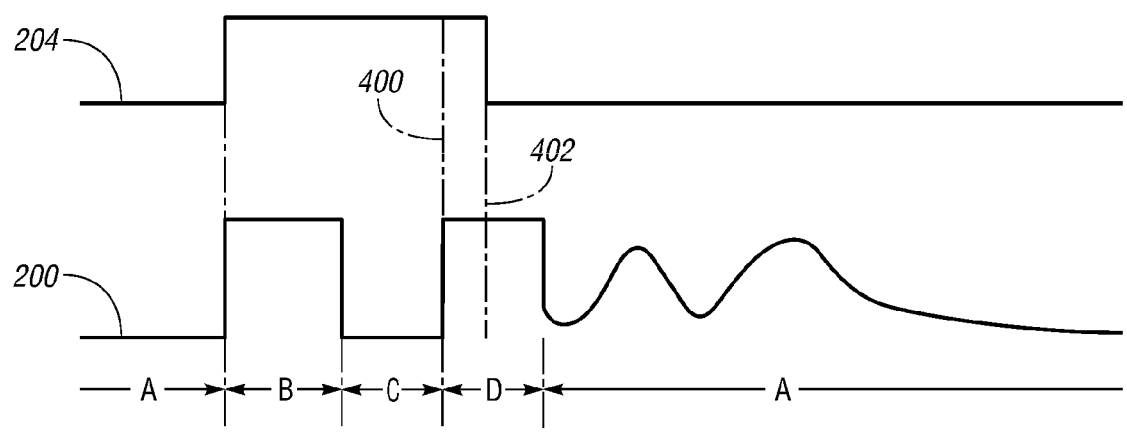
FIG. 12 illustrates a feedback signal for an ignition coil protection mechanism resulting in spark and combustion according to one embodiment of the present disclosure.

FIG. 12 illustrates a feedback signal for an ignition coil protection mechanism resulting in spark and combustion according to one embodiment of the present disclosure. Under some conditions, the ionization coil can turn itself off for protection. This may result in a spark discharge if the coil has charged to a sufficient level. This may be caused by an over current condition through the coil primary, an over voltage (load dump) condition, or a coil dwell timeout where the command signal is stuck high or commanded for an excessive period of time. This condition may be detected by the controller as indicated in FIG. 12 by the extended coil charging command 204, which results in an early spark occurring at 400, rather than when the command ends at 402. Unless this condition was caused by a coil primary fault, this indication may result in a spark discharge and combustion and may be associated with rapid RPM or battery voltage changes.

Figure 13:
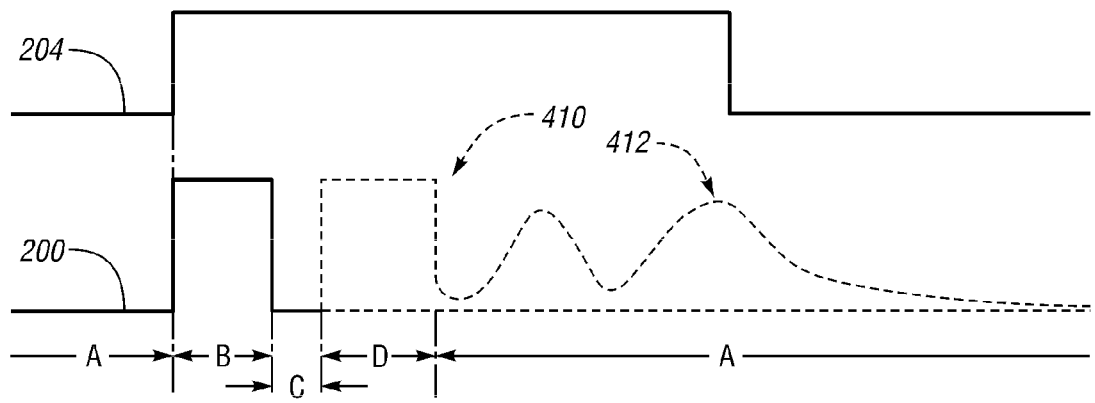
FIG. 13 illustrates a feedback signal for an ignition coil protection mechanism resulting in no spark and misfire according to one embodiment of the present disclosure.

FIG. 13 illustrates a feedback signal for an ignition coil protection mechanism resulting in no spark and misfire according to one embodiment of the present disclosure. If low battery voltage situations (preventing over-current from being reached) are encountered and the control line 204 remains asserted for too long of a time period, the coil can "timeout" and shut itself off. This might or might not result in a spark and combustion. However, the represented waveform 200 illustrated in FIG. 13 indicates a misfire where no spark or combustion occurs as indicated by the absence of a digital feedback signal at 410, and the absence of an ionization waveform at 412.

Figure 14:
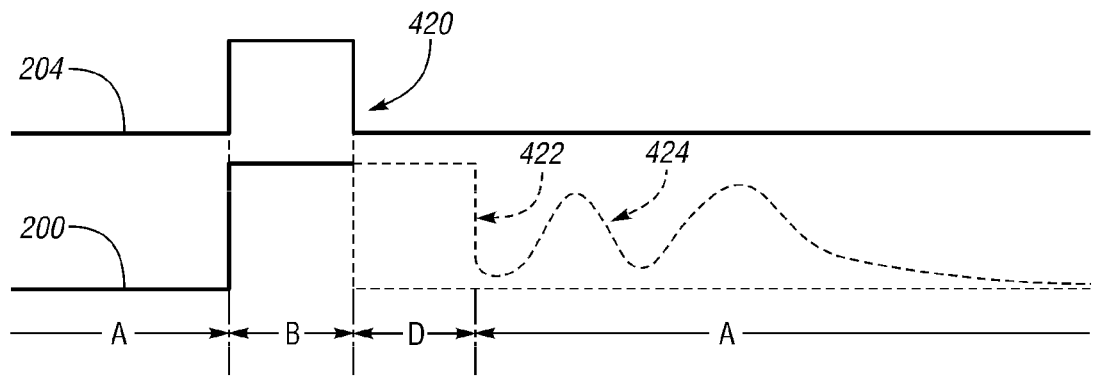
FIG. 14 illustrates a feedback signal for an ignition coil with an insufficient coil charging dwell signal according to one embodiment of the present disclosure.

FIG. 14 illustrates a feedback signal for an ignition coil with an insufficient coil charging dwell signal according to one embodiment of the present disclosure. Under dwell is typically caused by the processor not allowing the coil enough charge time, due to either rapidly changing voltage, RPM, or spark demand. This can result in: a spark discharge and combustion, a spark discharge, but no combustion (misfire), or no spark discharge and no combustion (also considered a misfire). As illustrated in FIG. 14, the coil command ends at 420 and may result in a digital feedback signal 422 and possibly an ionization current feedback signal 424, depending upon whether a spark discharge and combustion occur, respectively.

Figure 15:
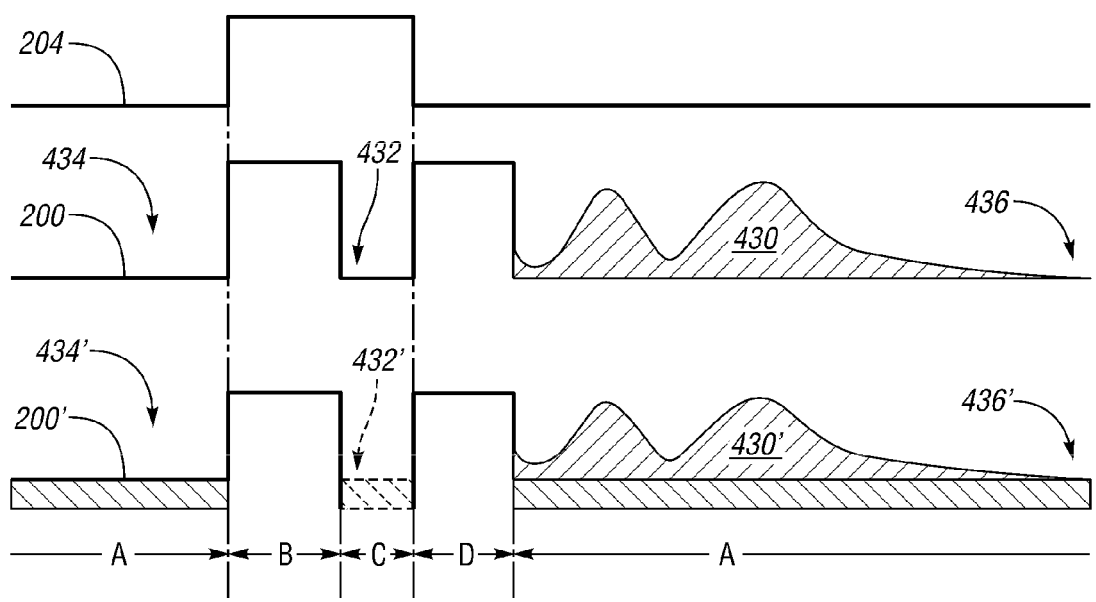
FIG. 15 illustrates feedback signals for an ignition coil used in detecting misfire according to one embodiment of the present disclosure.

FIG. 15 illustrates feedback signals for an ignition coil used in detecting misfire according to one embodiment of the present disclosure. A misfire may be detected by integrating the value of the ionization energy through a sampling window. If the integrated energy value is less than a predetermined amount above a background level, a misfire is determined. Feedback signal 200 represents a firing plug with area 430 represented the integration of the ionization signal waveform. A background level, which may be sampled from periods 432, 434, and/or 436, for example, is then used to adjust the integrated value before comparing to a misfire threshold. Feedback signal 200' is a representative waveform for a lightly fouled (but still firing) spark plug. The background leakage current attributable to the fouled plug is evident during sample periods 432', 434', and/or 436'. The integrated value associated with the background leakage is subtracted from the integrated value associated with combustion 430' and compared to at least one corresponding threshold to detect plug fouling and/or misfire.

Figure 16:
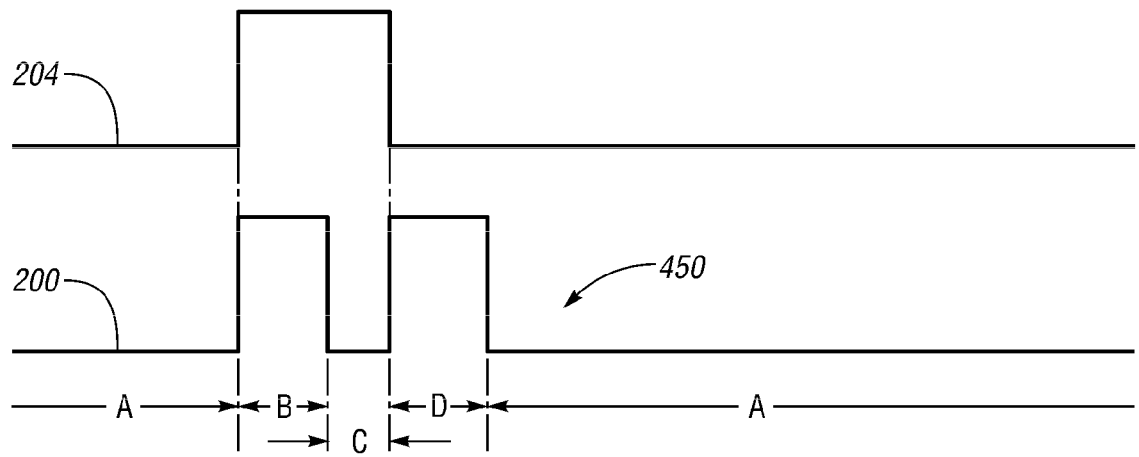
FIG. 16 illustrates a feedback signal for an ignition coil indicating a misfire with spark but no combustion according to one embodiment of the present disclosure.

FIG. 16 illustrates a feedback signal for an ignition coil indicating a misfire with spark but no combustion according to one embodiment of the present disclosure. The dwell control 204 and spark duration period "D" on feedback signal 200 appear as expected. However, the ionization waveform during period "A" is flat as indicated at 450. This may result from various operating conditions including an early coil shutoff caused by a transient condition, a commanded under-dwell, a high-voltage leakage path through the coil boot or coil housing, a fouled spark plug, an inappropriate air/fuel ratio or various coil faults, which may include primary or secondary winding anomalies resulting in low output voltage and energy, and/or an anomaly in the ionization voltage power supply.

Figure 17:
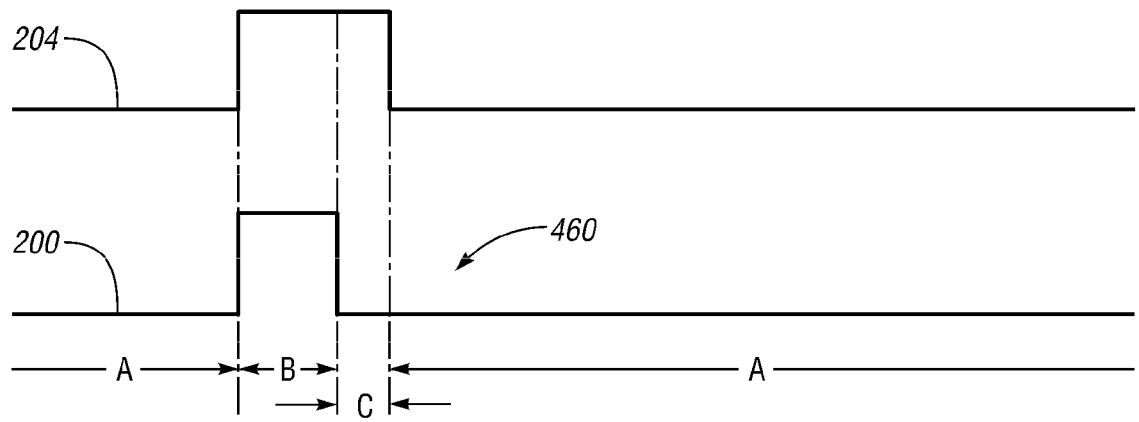
FIG. 17 illustrates a feedback signal for an ignition coil indicating a misfire with no spark and no combustion according to one embodiment of the present disclosure.

FIG. 17 illustrates a feedback signal for an ignition coil indicating a misfire with no spark and no combustion according to one embodiment of the present disclosure. The command signal 204 appears as expected with a corresponding feedback signal 200 during the period "B" dwell portion of the waveform. However, spark duration period "D" and ionization portion for period "A" are constant or flat as indicated at 460. Various operating anomalies may result in a feedback signal 200 as illustrated in FIG. 17 including, an early coil shutoff caused by a transient condition, a commanded under dwell, an open secondary circuit external to the ignition coil (associated with the spark plug or spring, for example), and/or a coil anomaly, which includes primary or secondary winding coil anomalies resulting in low output voltage and energy.

Figure 18:
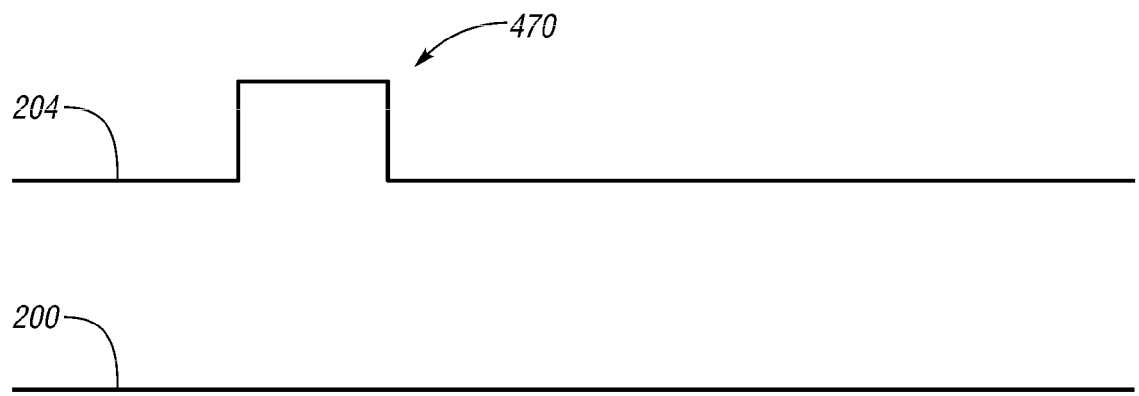
FIG. 18 illustrates a feedback signal for an ignition coil indicating a misfire with no response from the commanded ignition coil according to one embodiment of the present disclosure.

FIG. 18 illustrates a feedback signal for an ignition coil indicating a misfire with no response from the commanded ignition coil according to one embodiment of the present disclosure. As illustrated, command line 204 provides a coil dwell signal. However, no response is received from the commanded coil and no digital or analog waveform is present on feedback line 200. Those of ordinary skill in the art will recognize that this condition may be caused by any of a number of operating anomalies that may vary by application and implementation. Representative operating anomalies include various wire harness anomalies (disconnected; open or shorted to ground, control, or feedback; control shorted to battery voltage; open battery voltage or blown fuse; or open ground, for example), coil anomalies (open primary circuit, for example), damaged feedback output, which could be falsely indicating a misfire; or open or shorted control signal input, for example), or engine controller anomalies (output driver open or stuck high or low; input circuit open or stuck low).

Figure 19:
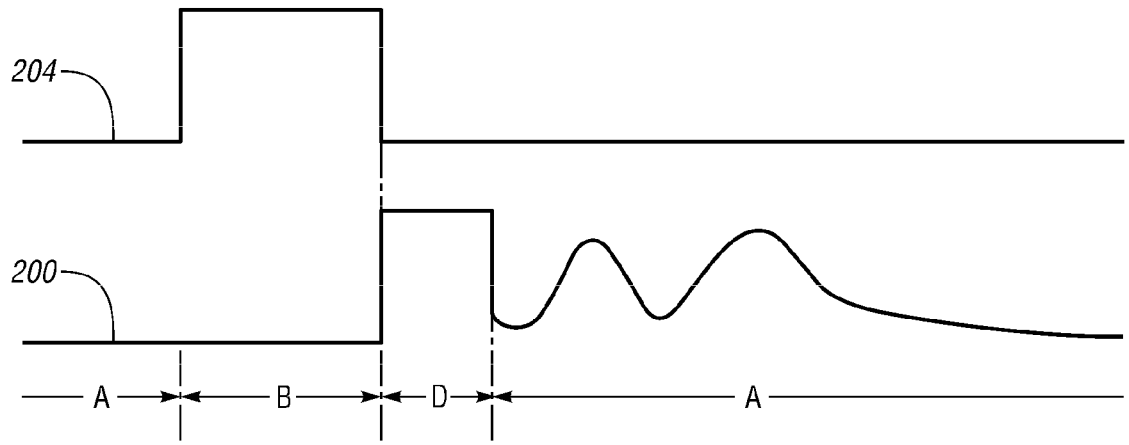
FIG. 19 illustrates a feedback signal for an ignition coil indicating an anomaly in the coil electronics according to one embodiment of the present disclosure.

FIG. 19 illustrates a feedback signal for an ignition coil indicating an anomaly in the coil electronics according to one embodiment of the present disclosure. The command signal 204 appears as expected. However, the corresponding dwell portion of the feedback waveform 200 during period "B" appears flat. In addition, the spark duration during period "D" and ionization feedback portion during period "A" indicate spark and combustion as expected. This is rather unlikely, but suggests an anomaly within the signal generating electronics integral to the ignition coil. Such a coil may fire normally if driven in an open loop fashion, but may have lost its capability to provide various control and diagnostics during one or more periods. As such, the coil may lose some protection features, such as a shut down from over current, for example.

Figure 20:
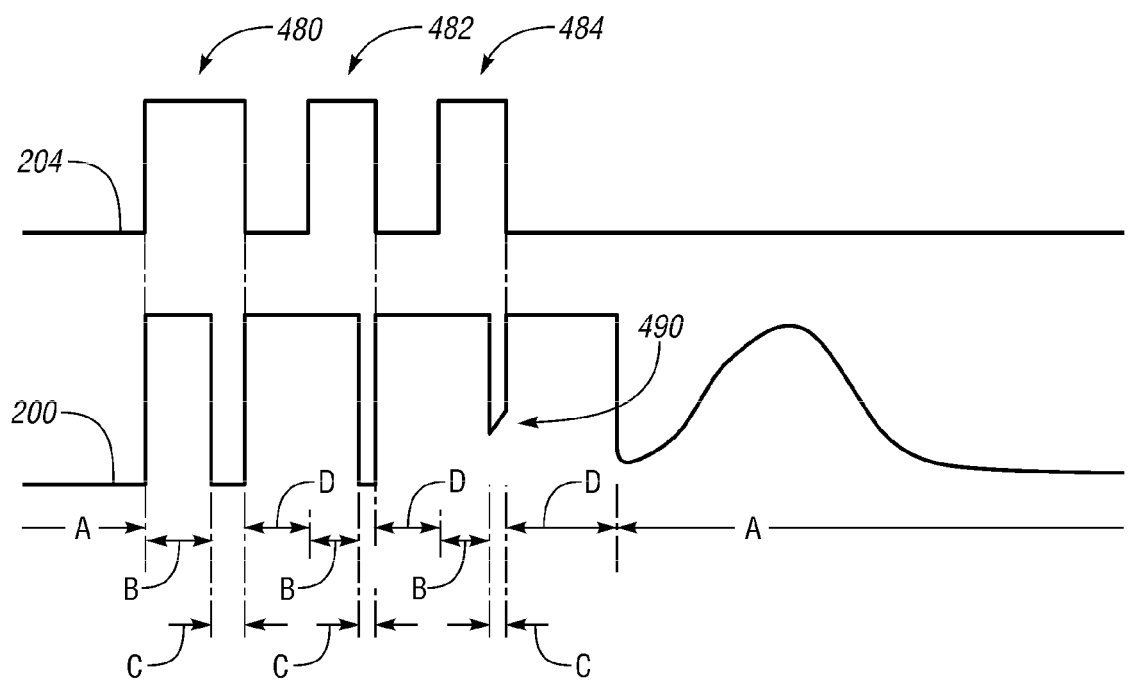
FIG. 20 illustrates a feedback signal from an ignition coil used for control of multi-strike operation according to one embodiment of the present disclosure.

FIG. 20 illustrates a feedback signal from an ignition coil used for control of multi-strike operation according to one embodiment of the present disclosure. Multi-strike or repetitive strike operation of a spark plug generally refers to providing two or more spark discharges from a single spark plug during the same combustion cycle. Ignition coil feedback according to the present disclosure may be used to adjust or tune multi-strike operation to deliver a maximum or otherwise desired amount of energy to the spark plug within a minimum amount of time by proper control of coil dwell (on) times and spark duration (off) times between spark events. As illustrated in FIG. 20, an initial firing command 480 on control signal line 204 is followed by a second firing command 482, and third firing command 484. Closed loop dwell control is provided by using the initial dwell period from the previous firing event to tune or adjust the later dwell events. In addition, the dwell periods and the average of the final spark durations from the cylinder can be used to tune the off times between spark events. The intermediate dwell and spark durations are adjusted accordingly by the control strategy implemented in the engine controller.

Use of ignition coil feedback according to the present disclosure also facilitates detecting when the flame front has reached the spark plug as represented at 490, and during the "C" periods of the re-dwells. As such, the ignition coil may be repetitively charged to generate repetitive spark discharges during a single combustion cycle in a single cylinder until the feedback signal exceeds a corresponding threshold associated with the flame front reaching the spark plug. This indicates that further re-strikes are not necessary for good combustion, allowing truncation of the procedure. This reduces spark plug wear and unnecessary coil heating.

Figure 21:
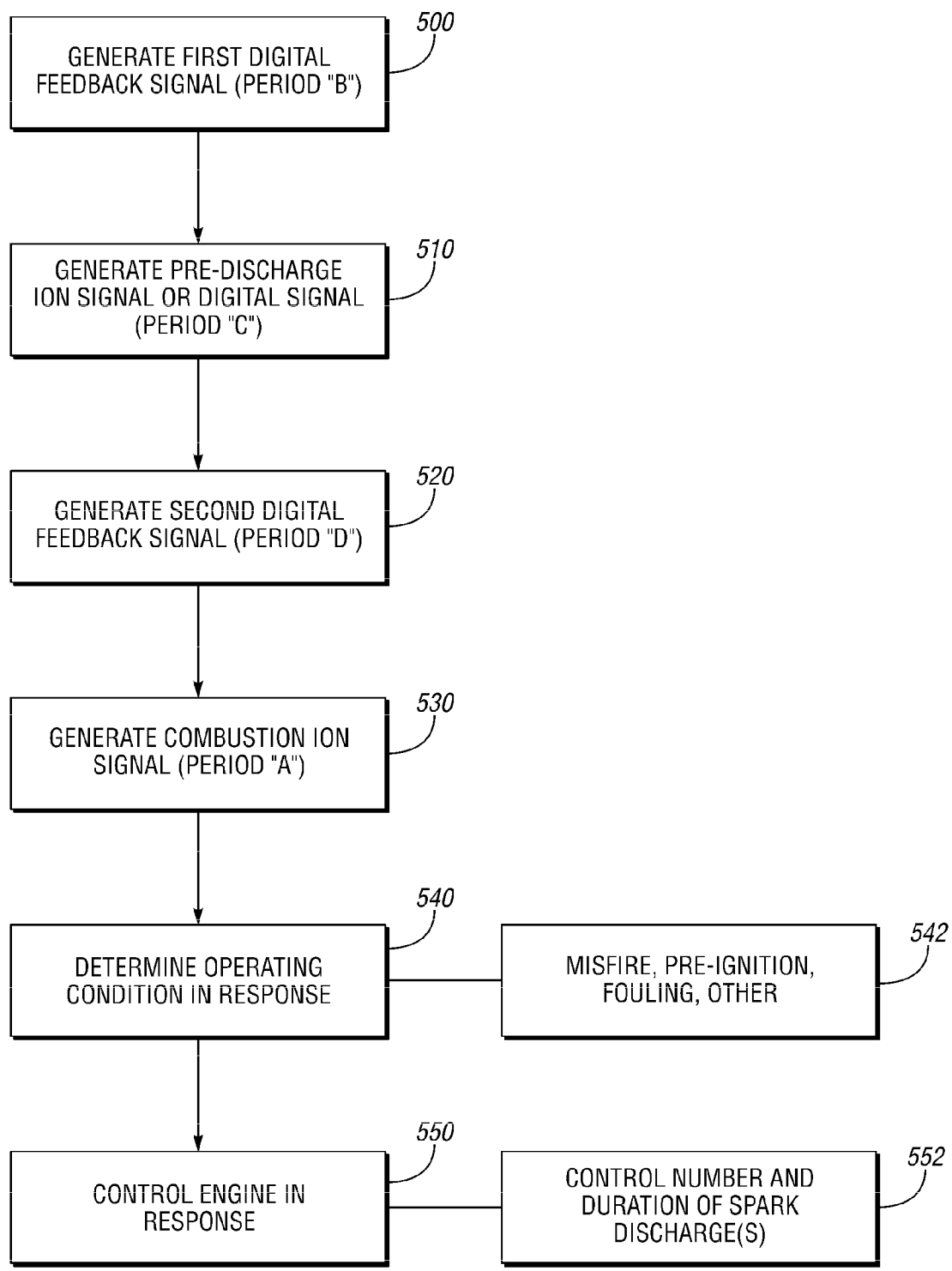
FIG. 21 illustrates operation of a system or method for controlling an internal combustion engine having an ignition coil providing digital feedback and ionization sensing according to embodiments of the present disclosure.

FIG. 21 is a flow chart illustrating operation of a system or method for controlling an internal combustion engine using ignition coil feedback according to embodiments of the present disclosure. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the figures. Similarly, one or more steps or functions may be repeatedly performed, or omitted, although not explicitly illustrated. In one embodiment, the functions illustrated are primarily implemented by software, instructions, or code stored in a computer readable storage medium and executed by a microprocessor-based computer or controller, such as represented by controller 22, to control combustion during operation of the engine.

A first digital feedback signal is generated by a corresponding ignition coil according to the present disclosure during period "B" as represented by block 500. As previously described, the first digital feedback signal is generated in response to a coil charging signal until the ignition coil reaches the first threshold charge level or partial dwell flag level, which is less than the spark discharge charge level. A pre-discharge ionization signal (or in some embodiments a third digital feedback signal) is generated during charging of the ignition coil after reaching the first threshold charge level and prior to spark discharge during period "C" as represented by block 510. A second digital feedback signal is generated in response to the ignition coil being above the spark discharge charge level and no charging signal being present during period "D" as represented by block 520. A combustion ionization signal is generated after the second digital feedback signal during period "A" as represented by block 530. The pre-discharge ionization signal, combustion ionization signal, and/or the digital feedback signals are analyzed to determine engine operating condition as represented by block 540. This may include detecting misfire, plug fouling, pre-ignition, or various other conditions as described herein and represented by block 542. The engine is then controlled in response to the operating condition as represented by block 550. This may include controlling the number and duration of repetitive spark discharges during a single combustion cycle in a single cylinder in response to at least the first and second digital feedback signals as represented by block 552, for example.

As illustrated and described with respect to FIGS. 1-21, the present disclosure includes embodiments having various advantages including facilitating detection of pre-ignition combustion or fouled plug conditions in applications having multiplexed or combined feedback signals from two or more ignition coils. The present disclosure includes embodiments that provide a digital feedback signal used for ignition coil dwell control and diagnostics, as well as spark duration control and diagnostics. The various embodiments provide ignition coil dwell and spark duration feedback for use in controlling the number and duration of multi-strike or repetitive spark events during a single combustion cycle.

While one or more embodiments have been illustrated and described, it is not intended that these embodiments illustrate and describe all possible embodiments within the scope of the claims. Rather, the words used in the specification are words of description rather than limitation, and various changes may be made without departing from the spirit and scope of the disclosure. While various embodiments may have been described as providing advantages or being preferred over other embodiments or prior art implementations with respect to one or more desired characteristics, as one skilled in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure and may be desirable for particular applications.

What is claimed:

1. A method for controlling an internal combustion engine having an ignition coil associated with at least one spark plug, the method comprising:
    generating a pre-discharge ionization signal during charging of the ignition coil after reaching a first threshold charge level and prior to spark discharge;
    determining engine operating condition in response to the pre-discharge ionization signal;
    generating a first digital feedback signal in response to a coil charging signal until the ignition coil reaches the first threshold charge level, the first threshold charge level being less than a spark discharge charge level;
    generating a second digital feedback signal in response to the ignition coil being above the spark discharge charge level and no charging signal being present;
    controlling number and duration of repetitive spark discharges during a single combustion cycle in a single cylinder in response to at least the first and second digital feedback signals;
    transmitting the first and second digital feedback signals by a common wire; and
    determining operating condition of the at least one spark plug associated with the second ignition coil in response to the pre-discharge ionization signal on the common wire, wherein generating a pre-discharge ionization signal includes generating a third digital signal in the first ignition coil to mask the pre-discharge ionization signal.

2. The method of claim 1 further comprising:
    generating a combustion ionization signal after the second digital feedback signal; and
    processing the combustion ionization signal to determine combustion quality.

3. The method of claim 1 further comprising:
    determining misfire in response to the pre-discharge ionization signal and a second ionization signal occurring after the second digital feedback signal.

4. The method of claim 1 comprising:
    determining fouling of the plug associated with the second ignition coil in response to the pre-discharge ionization signal on the common wire exceeding the third digital signal level.

5. The method of claim 1 further comprising:
    determining fouling of the plug associated with the second ignition coil in response to the pre-discharge ionization signal on the common wire exceeding a corresponding plug fouling threshold.

6. A method for controlling an engine, comprising:
    generating a pre-discharge ionization signal, a first digital feedback signal until an ignition coil reaches a first threshold charge, and a second digital feedback signal in response to the ignition coil being above a spark discharge charge and no charging signal present;
    controlling number and duration of repetitive spark discharges during a single combustion cycle in a single cylinder in response to the digital feedback signals;
    transmitting the first and second ignition coil outputs together to provide corresponding feedback signals on a common wire; and
    determining operating condition of a spark plug associated with the second ignition coil in response to the pre-discharged ionization signal on the common wire, wherein determining operating condition of the spark plug includes generating a third digital signal in the first ignition coil to mask the pre-discharge ionization signal.

7. The method of claim 6 further comprising determining fouling of the plug associated with the second ignition coil in response to the pre-discharge ionization signal on the common wire exceeding the third digital signal level.

8. The method of claim 6 further comprising determining fouling of the plug associated with the second ignition coil in response to the pre-discharge ionization signal on the common wire exceeding a corresponding plug fouling threshold.

9. The method of claim 6 further comprising determining misfire in response to the pre-discharge ionization signal and a second ionization signal occurring after the second digital feedback signal.

* * * * *